UNITED STATES PATENT OFFICE.

RICHARD HEIM, OF CANASTOTA, NEW YORK, ASSIGNOR OF ONE-HALF TO FREDERICK BEHREND, OF NEW YORK, N. Y.

PROCESS FOR PRODUCING ADHESIVES.

1,018,559.  Specification of Letters Patent.  Patented Feb. 27, 1912.

No Drawing.   Application filed June 7, 1911. Serial No. 631,796.

*To all whom it may concern:*

Be it known that I, RICHARD HEIM, a subject of the German Emperor, residing at Canastota, in the county of Madison and State of New York, have invented certain new and useful Improvements in Processes for Producing Adhesives; and I do hereby declare the following to be a full, clear, and exact description of the invention, such as will enable others skilled in the art to which it appertains to make and use the same.

My invention has for its object the production of an improved adhesive, glue or sizing from skim milk and particularly has for its object the production of an adhesive from skim milk directly without any preliminary separation or precipitation of the casein contained in said milk.

It has heretofore been customary to produce adhesive bodies from skim milk by the separation of the casein contained therein by means of dilute acid or by other means, the drying of the casein so separated and the subsequent solution of said casein by means of alkaline bodies.

It is the purpose of my invention to treat the skim milk directly and to convert all of the solids contained in said skim milk into an adhesive material, thus enabling me to secure a greater yield of adhesives from a given amount of skim milk and by my method of procedure, no separation of the casein from the other solids contained in the milk is required.

In carrying out my improved process, I proceed as follows:—The skim milk is concentrated in a vacuum until the volume is reduced to one-third or one-fourth of the original volume; to this concentrated liquid is slowly added with continuous agitation a small percentage of diluted acid. I prefer to use not more than twenty to thirty centimeters of commercial sulfuric acid to one hundred pounds of milk. It will be well understood that hydrochloric acid or other organic or inorganic acids may be used for the purpose of acidulating the milk or that acid salts such as the alum or bisulfate of soda may be used for this purpose. The acid should be added slowly and very gradually so as to avoid coagulating any of the casein in the milk. The milk so acidulated is then heated to about 100 degrees Fahrenheit and kept at a temperature of 100 to 120 degrees Fahrenheit for a period of two hours, the liquid being constantly agitated during this treatment. I find that I can heat the liquid up to a temperature of 160 degrees Fahrenheit without coagulation of the casein but the best results are obtained by the employment of a temperature of 100 to 120 degrees Fahrenheit. The liquid is then slowly dried in a vacuum in pans or rollers or any other suitable manner, the means for drying forming no part of my invention. I thus obtain a dry white powder which is suitable for employment as an adhesive. To render same soluble after drying, a small quantity of an alkaline material should be added to the powder before using. The purpose of the alkaline material is to neutralize any acid remaining in the powder in case a non-volatile acid such as sulfuric acid has been used in the preliminary treatment and also to render the albumenoid bodies in the adhesive more soluble.

In practice I have found tri-basic sodium phosphate a suitable alkaline body to be added to the powdered adhesive before solution. Borax, sodium carbonate and other alkaline bodies may also be used, the choice of such alkaline bodies depending upon the acid used in the preliminary treatment.

For use as an adhesive, the powder with a sufficient quantity of alkaline solid therein may be dissolved in three or four parts of water. I find in practice that this adhesive can be improved by blending with same a certain percentage of animal or vegetable adhesives and by regulating the percentage of other adhesives added according to the uses for which the adhesive is intended, bodies may be obtained of any required tenacity, strength, smoothness and flexibility.

Having thus described my invention, what I claim is:—

1. A process for producing an adhesive by condensing skim milk, acidulating the condensed skim milk and evaporating to dryness.

2. The process of producing an adhesive by condensing skim milk to one third its volume, acidulating the condensed skim milk and evaporating to dryness.

3. The process of producing an adhesive by condensing skim milk to one third its volume, acidulating said condensed skim milk, heating said condensed skim milk and evaporating to dryness.

4. The process of producing an adhesive by condensing skim milk, acidulating said condensed skim milk, heating said skim milk for a period of two hours and evaporating the liquid to dryness.

5. The process of producing an adhesive by condensing skim milk, acidulating the condensed skim milk, heating said acidulated condensed skim milk for a period of two hours at a temperature of 100 to 120 degrees Fahrenheit and evaporating to dryness.

6. The process of producing an adhesive by condensing skim milk, acidulating said condensed skim milk, heating said milk for a period of two hours, drying said milk and adding to the dry powder a quantity of an alkaline product.

7. The process of producing an adhesive by condensing skim milk, acidulating said skim milk, heating same for a period of two hours at a temperature of 100 to 120 degrees Fahrenheit, drying said milk and adding a small percentage of an alkaline body to said product.

8. The process of producing an adhesive by condensing skim milk to one third its volume, acidulating the said milk, heating said milk at a temperature of 100 to 120 degrees Fahrenheit, drying said milk and adding an alkaline body to said product.

9. The process of producing an adhesive by evaporating skim milk to a small proportion of its original volume, acidulating said milk, heating said milk and drying said product.

10. The process of producing an adhesive by evaporating skim milk to a small proportion of its original volume, acidulating said milk, heating said milk, drying said product and adding an alkaline body to said product.

In testimony whereof I affix my signature in presence of two witnesses.

RICHARD HEIM.

Witnesses:
  HUGO MOCK,
  MARY PERRY.